United States Patent Office 3,240,681
Patented Mar. 15, 1966

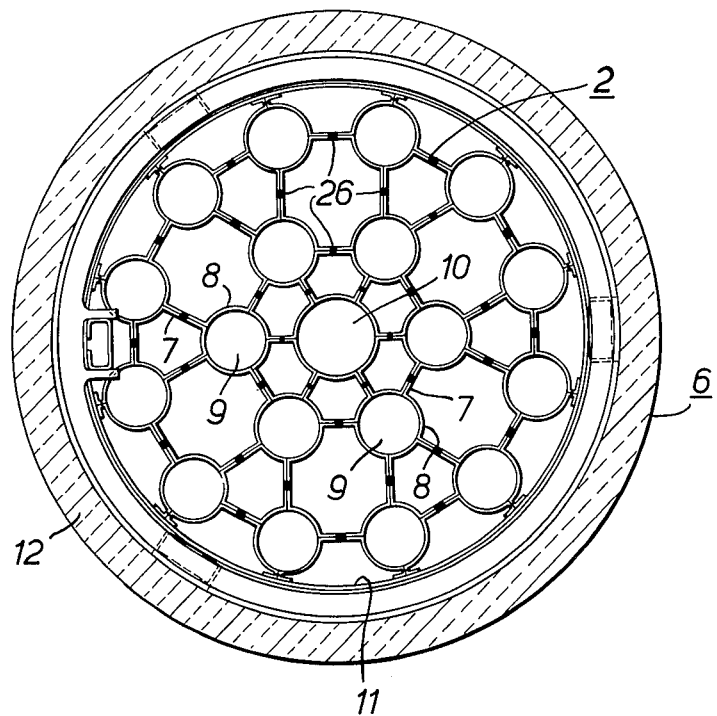

3,240,681
FUEL ELEMENTS FOR NUCLEAR REACTORS
Peter Waine, Padgate, Warrington, and James Duncan Waters, Lymm, England, assignors to United Kingdom Atomic Energy Authority, London, England
Filed Apr. 12, 1962, Ser. No. 186,979
Claims priority, application Great Britain, May 24, 1961, 18,707/61
3 Claims. (Cl. 176—78)

This invention relates to fuel elements for nuclear reactors and it is concerned with that type of fuel element known as a "cluster fuel element."

A cluster fuel element comprises a spaced array of individual fuel members end-located in support structures of grid-like form. As the grid support structures have to be traversed by coolant flow it is usual to construct them from thin section webs so as not to impede the coolant flow unduly.

It has now been discovered that, with temperature changes, movements of the fuel member relative to the thin webs can cause the grid support structures to deform, and there is then the risk of subsequent collapse of the structures.

According to the present invention, a cluster fuel element comprising a spaced array of individual fuel members end-located in grid support structures constructed from thin webs, is characterised in that the fuel members are integrated with the grid support structures and means are provided to allow growth of the fuel element from one end.

The invention provides a cluster fuel element wherein the webs of the grid support structures can be made very thin (e.g. .010" to .020") so that coolant pressure drops across the structures are not significant.

Whilst it will be appreciated that the strength of such grid support structures will be such that they may be inherently incapable of withstanding deformation under reactor operating conditions, it will be realised that they will be stable by virtue of their integration with the fuel members. In other words, deformation of the thin webs is tolerated (as it avoids undue stressing of the fuel members) but, because of integration of fuel members and grid support structures, the deformation will not result in collapse of the structures.

Figure 1:
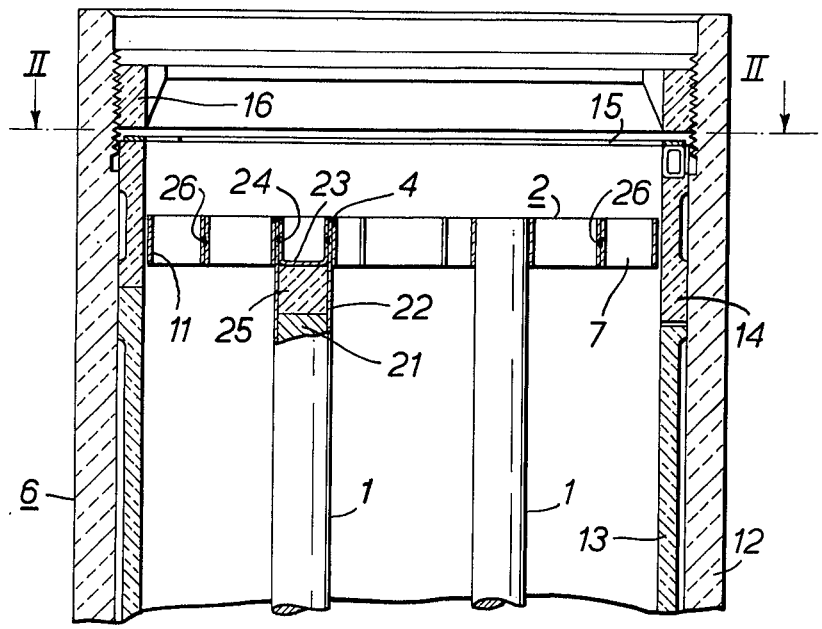
Figure 1:
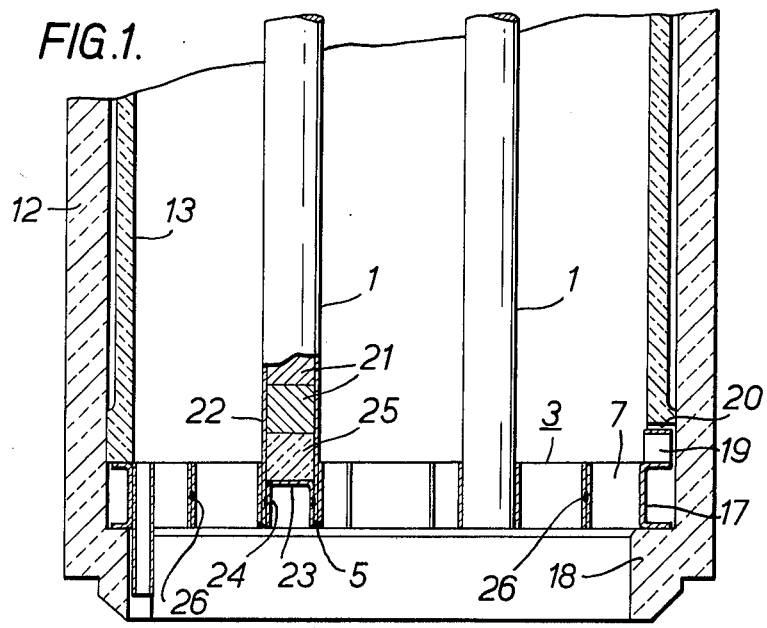

By way of example, a cluster fuel element according to the invention will now be described with reference to the accompanying drawings in which:

FIGURE 1 is a sectional elevation, and
FIGURE 2 is a section on the line II—II of FIGURE 1.

FIGURES 1 and 2 show a cluster fuel element comprising a spaced array of fuel rods 1 end-located in grid support structures 2, 3 constructed from thin webs, the rods 1 being integrated with the structures 2, 3 by circumferential seam welds 4, 5, and the structure 3 being held in a carrier member 6 whilst the structure 2 is free to move, with the fuel rods 1, within the member 6.

The structure 2 comprises very thin (.010") stainless steel strips 7 (.35" deep) having transverse troughs 8 of arcuate form at intervals and assembled with the lengths of the strips 7 intermediate the troughs 8 juxtaposed in pairs to form the webs of the structure, with the troughs 8 coming together to define eighteen spaced fuel element openings 9 (in which the ends of the rods 1 are located) and a central tie-rod opening 10. The juxtaposed lengths of the strips 7 forming the webs are secured together remote from the openings 9 by resistance welds 26. (The rods 1 have been omitted from FIGURE 2 for clarity.) The outermost strips 7 have flanged ends welded to the inside of a stainless steel support ring 11 of 3.9" inside diameter.

The very thin webs of the structure 2 (and similarly the structure 3) occupy only .616 square inches of cross section and thus offer little impedance to coolant flow through the carrier member 6.

The carrier member 6 comprises an outer graphite sleeve 12 and an inner graphite sleeve 13 having a spigoted ring 14 covered by a spigoted locking ring 15, and the sleeve 12 is fitted at its upper end with a screwed graphite ring 16.

The structure 3 is similar to the structure 2 except that it is deeper (0.5") and that the flanged ends of the outermost strips 7 are welded to the inside of the U section annular support 17 of stainless steel construction. The support 17 seats on a flange 18 of the sleeve 12 and has a spigot 19 engaging in a corresponding recess 20 in the sleeve 13.

In this way the structure 3 is held in the member 6 whilst the structure 2 is free to move in the member 6, there being typically a 0.02" radial clearance between the O.D. of the ring 11 and the I.D. of the ring 14 for a 5" diameter of the sleeve 12.

Each fuel rod 1 comprises a stack of sintered $UO_2$ fuel pellets 21 (.4" diameter, .4" deep) contained in a tubular sheath (.012" thick) 22 of stainless steel, end caps 23 of stainless steel being sealed to the ends of the sheath 22 by resistance welds 24. The pellets 21 are spaced from the end caps 23 but heat insulating plugs 25 of sintered alumina. The seam welds 4, 5 are made between the end caps 23 and the parts of the strips 7 bounding the openings 9.

Since the rods 1 are integrated to the structures 2, 3 and the structure 3 is held in the member 6 whilst the structure 2 is free to move in the member 6, the structure 2 will follow any movement of the rods 1. The strength of the webs 7 is such that individual growth of the fuel rods 2 results in deformation of the structures 2, 3 by buckling of the very thin webs 7, but, because of their integration with the fuel rods 2, this deformation does not lead to collapse of the structures.

The rods 1 may alternatively be joined to the structures 2, 3 by brazing. Brazing or welding or other equivalent methods, of course, provides a metallurgical bond between the rods and web structure.

We claim:

1. A cluster fuel element comprising a graphite tubular casing for conducting coolant, an elongate fuel assembly disposed lengthwise within the casing, fuel assembly support means adjacent one end of the casing and arranged to transmit the weight of the fuel assembly to the wall of the casing, said fuel assembly comprising first and second grid structures spaced apart from each other and disposed transversely within the casing with the first grid structure carried by said support means, said first and second grid structures defining aligned lattices of openings, a cluster of elongate fuel members extending lengthwise between the grid structures, the ends of the fuel member being located by the openings of the grid structures and being united with the grid structures by a metallurgical bond, said second grid structure having side clearance with the wall of the casing so as to allow longitudinal motion of the second grid structure within the casing, the grid structures comprising thin webs disposed edge-on to coolant flow through the casing, the webs being deformable under axial loading resulting from longitudinal growth of the individual fuel member united therewith and without undue stressing of said fuel members, said thin webs comprising thin strips having transverse troughs at intervals and assembled with the lengths of the strips intermediate the troughs juxtaposed in pairs to form the web of the structure, with the trough coming together to define openings for end-location of the fuel members, the juxtaposed lengths of the strips being secured together remote from the troughs.

2. A cluster fuel element as claimed in claim 1 wherein said metallurgical bond uniting the grid structures and the ends of the fuel members comprise weld means.

3. A cluster fuel element as claimed in claim 1 wherein said webs are from 0.01 to 0.02 inch in thickness.

References Cited by the Examiner

UNITED STATES PATENTS

| | | | |
|---|---|---|---|
| 1,852,363 | 4/1932 | Parent | 122—510 |
| 2,346,715 | 4/1944 | Woodward et al. | 122—235 |
| 2,977,297 | 3/1961 | Evans et al. | 176—81 |
| 2,983,660 | 5/1961 | Loeb et al. | 29—420.5 |
| 3,068,163 | 12/1962 | Currier et al. | 176—78 |
| 3,089,837 | 5/1963 | Moore | 176—78 |
| 3,104,218 | 9/1963 | Speidel et al. | 176—78 |
| 3,128,235 | 4/1964 | Hackney et al. | 176—78 |

FOREIGN PATENTS

| | | |
|---|---|---|
| 1,214,056 | 11/1959 | France. |
| 1,246,699 | 10/1960 | France. |
| 1,259,772 | 3/1961 | France. |

OTHER REFERENCES

GER–1301, A Design Description of the Dresden Nuclear Power Station, November, 1956, pages 12 and 13 (especially page 12, col. 2, sixth paragraph, last sentence and FIG. 11).

German application No. 1,074,168, Frisch, Jan. 28, 1960.

German application No. 1,087,285, Kumpf et al., Aug. 18, 1960.

CARL D. QUARFORTH, *Primary Examiner.*